US011215170B2

United States Patent
Zamani et al.

(10) Patent No.: US 11,215,170 B2
(45) Date of Patent: Jan. 4, 2022

(54) SHAPE MEMORY ALLOY ACTUATOR WITH STRAIN GAUGE SENSOR AND POSITION ESTIMATION AND METHOD FOR MANUFACTURING SAME

(71) Applicant: Smarter Alloys Inc., Waterloo (CA)

(72) Inventors: Nima Zamani, Waterloo (CA); Michael Kuntz, Waterloo (CA); Mohammad Ibrahem Khan, Waterloo (CA)

(73) Assignee: Smarter Alloys Inc., Waterloo (CA)

( * ) Notice: Subject to any disclaimer, the term of this patent is extended or adjusted under 35 U.S.C. 154(b) by 278 days.

(21) Appl. No.: 16/353,710

(22) Filed: Mar. 14, 2019

(65) Prior Publication Data

US 2019/0264664 A1    Aug. 29, 2019

Related U.S. Application Data

(63) Continuation of application No. PCT/CA2017/051084, filed on Sep. 14, 2017.
(Continued)

(51) Int. Cl.
*F03G 7/05* (2006.01)
*F03G 7/06* (2006.01)
(Continued)

(52) U.S. Cl.
CPC .............. *F03G 7/065* (2013.01); *G05D 15/01* (2013.01); *F05C 2251/08* (2013.01); *G01L 5/103* (2013.01); *H01H 37/323* (2013.01)

(58) Field of Classification Search
CPC ...... F03G 7/065; G05D 15/01; H01H 37/323; F05C 2251/08
See application file for complete search history.

(56) References Cited

U.S. PATENT DOCUMENTS 5,335,498 A * 8/1994 Komatsu ................ B25J 9/1085
219/200
6,447,478 B1 * 9/2002 Maynard ................ F03G 7/065
600/151
(Continued)

FOREIGN PATENT DOCUMENTS

CN    1521286 A    8/2004
CN    102016308 A    4/2011
(Continued)

OTHER PUBLICATIONS

WO-2012076247-A2 English Translation (Year: 2012).*
(Continued)

*Primary Examiner* — Shafiq Mian
(74) *Attorney, Agent, or Firm* — Gowling WLG (Canada) LLP

(57) ABSTRACT

A shape memory actuator including: a monolithic shape memory alloy; a shape memory effect (SME) section of the alloy, configured for actuation; a pseudo-elastic (PE) section of the alloy, configured as a sensor for enabling position sensing; and a control system configured to control the actuator by controlling a current through at least the SME section based on the sensor results of the PE section. A method of controlling a shape memory actuator, the method including: applying a predetermined current through the actuator; measuring a first resistance of the SME section; measuring a second resistance of the PE section; calculating an estimated position of the actuator based on the first and second resistances; and adapting the current applied to the actuator based on the estimated position. A method of manufacturing a shape memory actuator, the method including: laser processing; thermomechanically treating; and training the shape memory alloy.

7 Claims, 16 Drawing Sheets

Related U.S. Application Data

(60) Provisional application No. 62/394,491, filed on Sep. 14, 2016.

(51) Int. Cl.
  G05D 15/01 (2006.01)
  G01L 5/103 (2020.01)
  H01H 37/32 (2006.01)

(56) References Cited

U.S. PATENT DOCUMENTS

| | | | | |
|---|---|---|---|---|
| 6,543,224 | B1* | 4/2003 | Barooah | F03G 7/065 60/527 |
| 6,832,478 | B2* | 12/2004 | Anderson | F03G 7/065 60/527 |
| 2006/0201149 | A1* | 9/2006 | Biggs | H01H 1/0036 60/527 |

FOREIGN PATENT DOCUMENTS

| | | | |
|---|---|---|---|
| CN | 103076739 | | 5/2013 |
| CN | 104643418 A | | 5/2015 |
| DE | 102010054118 A1 | | 6/2012 |
| JP | S61181903 | | 8/1986 |
| WO | WO 2009/137750 A2 | | 11/2009 |
| WO | WO-2012076247 A2 * | 6/2012 | F03G 7/065 |
| WO | WO 2014/080344 A1 | | 5/2014 |

OTHER PUBLICATIONS

"Linear microactuators based on the shape memory effect" to M. Kohl et al. (1998) (Year: 1998).*

"TiNi-based thin films in MEMS applications: a review" to Yongquing Fu et al. (2004) (Year: 2004).*

Canadian Intellectual Property Office as International Searching Authority, International Search Report for PCT/CA2017/051084, dated Dec. 22, 2017.

Canadian Intellectual Property Office as International Searching Authority, International Preliminary Report on Patentability for PCT/CA2017/051084, dated Mar. 19, 2019.

English translation of Abstract of JPS61181903, retrieved from Espacenet Jun. 20, 2019.

English translation of Abstract of DE102010054118, retrieved from Espacenet Jun. 20, 2019.

Kohl et al.: "Linear microactuators based on the shape memory effect", Sensors and Actuators A: Physical, Elsevier BV, NL, vol. 70, No. 1-2, Oct. 1, 1998 (Oct. 1, 1998), pp. 104-111, XP004140119, ISSN: 0924-4247, DOI: 10.1016/30924-4247(98)00121-6.

Fu Y et al.: "TiNi—based thin films in MEMS applications: a review", Sensors and Actuators A: Physical, Elsevier BV, NL, vol. 112, No. 2-3, May 1, 2004 (May 1, 2004), pp. 395-408, XP004505731, ISSN: 0924-4247.

Chinese Patent Office, Notification of the First Office Action, of Chinese Patent Application No. 201780063759.6 dated Mar. 26, 2020.

European Patent Office, Extended European Search Report for Application No. 17849967.9 dated Apr. 15, 2020.

Chinese Patent Office, Notification of the Second Office Action, of Chinese Patent Application No. 201780063759.6 dated Nov. 4, 2020.

Chinese Patent Office, Notification of the Third Office Action, of Chinese Patent Application No. 201780063759.6 dated May 8, 2021.

Indian Patent Office, First Examination Report for corresponding Indian Patent Application No. 201917010466, dated Jan. 1, 2021.

* cited by examiner

SHAPE MEMORY ALLOY ACTUATOR WITH STRAIN GAUGE SENSOR AND POSITION ESTIMATION AND METHOD FOR MANUFACTURING SAME

REFERENCE TO RELATED APPLICATION(S)

This document is a formal application based on and claiming the benefit of provisional application No. 62/394,491, filed Sep. 14, 2016, which is hereby incorporated herein by reference.

FIELD

The embodiments disclosed herein relate to a shape memory alloy actuator that includes a strain gauge sensor and/or position estimation and a method of manufacturing the actuator.

BACKGROUND

Shape Memory Alloys (SMAs) are a class of materials which exhibit unique properties including Shape Memory Effect (SME) and Pseudo-Elasticity (PE). The first observation of SME behaviour occurred in 1932 by Arne Olander with Cadmium-Gold alloy. However, it was not until the 1960s when the term Shape Memory Alloys was given to a set of materials which exhibit similar properties. Numerous alloy compositions of shape memory alloys have been identified, including CuAlNi, TiNb FePt and many more. However, the most widely used and commercially available SMA is NiTi, commonly referred to as Nitinol. NiTi provides several advantages over other SMAs such as high force to mass ratio, large recoverable strain, super-elasticity, and bio-compatibility.

SMA's are used in a variety of applications, such as biomedical vascular stents, automotives, robotics, aviation, and vibration absorption to name a few. However, there remain some drawbacks that may limit the application of SMA's, including difficulties in obtaining position and/or strain feedback from actuators.

As such, there is a need for an improved actuator and method for manufacture or fabrication that overcome at least some of the issues with conventional SMA actuators.

SUMMARY

According to one aspect herein, there is provided a shape memory actuator including: a monolithic shape memory alloy; a shape memory effect (SME) section of the monolithic shape memory alloy, configured for actuation; a pseudo-elastic (PE) section of the monolithic shape memory alloy, configured as a sensor for enabling position sensing; and a control system configured to control the actuator by controlling a current through at least the SME section based on the sensor results of the PE section.

In a particular case, the PE section may be configured as a strain gauge.

According to another aspect herein, there is provided a method of controlling a shape memory actuator, the method including: applying a predetermined current through the actuator via a control system; measuring a first resistance of a shape memory effect (SME) section of the actuator; measuring a second resistance of a pseudo-elastic (PE) section of the actuator; calculating an estimated position of the actuator, via the control system, based on the first and second resistances; and adapting the current applied to the actuator, via the control system, based on the estimated position.

According to another aspect herein, there is provided a method of manufacturing a shape memory actuator, the method including: laser processing a shape memory alloy to provide a shape memory effect (SME) section having a different transformation temperature than an existing pseudo-elastic (PE) section; thermomechanically treating the laser processed shape memory alloy; and training the thermomechanically treated shape memory alloy.

In a particular case, the thermomechanically treating may include: solution annealing the laser processed shape memory alloy; work hardening the laser processed shape memory alloy; and heat treating the laser processed shape memory alloy. In this case, the work hardening may include: drawing the laser processed shape memory alloy through one or more dies; and periodically inter-annealling the laser processed shape memory alloy during drawing.

In another particular case, the training may include one or both of isothermal stress cycling or isostress thermal cycling.

Other aspects and features will become apparent, to those ordinarily skilled in the art, upon review of the following description of some exemplary embodiments.

BRIEF DESCRIPTION OF THE DRAWINGS

Embodiments will now be described, by way of example only, with reference to the attached drawings, in which.

DETAILED DESCRIPTION

Figure 1:
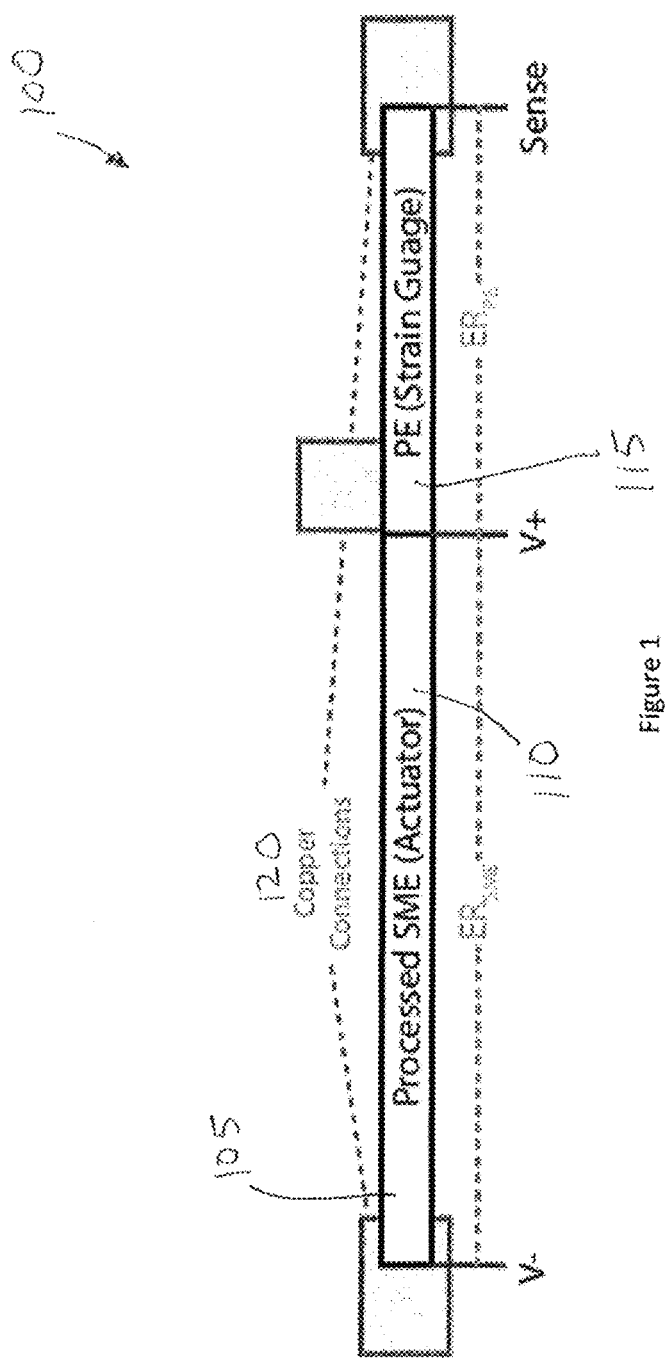
FIG. 1 is a schematic showing an embodiment of an actuator.

The following description generally relates to an improved actuator that includes a strain gauge sensor and can be used with a position estimation algorithm that can be used by a control system to control actuator position under dynamic and unknown stress levels or control force directly. Generally speaking, the actuator includes two or more different material compositions (sections) in one monolithic piece of actuator wire. Each of these compositions behave differently at room temperature, one exhibits a shape memory effect (SME) for actuation, and the other a pseudo-elastic (PE) effect, which is used to enable a sensor (sometimes referred to as an embedded sensor because it is part of the actuator itself). Fabrication of the actuator includes laser processing, heat-treatment, and cold-working procedures, as well as subsequent training to stabilize properties using, for example, isostress thermal cycling. The actuator can also include a model-based external sensor-less position estimation algorithm that uses two resistance measurements across the two different material compositions. Until now, external sensor-less position estimation of SMA actuators under dynamic unknown applied stresses has been very difficult if not impossible due to the complexity of the system and the number of unknown parameters. In embodiments described herein, extra information obtained from the embedded sensor is intended to solve this issue. In particular, the proposed actuator is expected to have applications where the mechanical load is not known in advance.

As noted above, there are issues in conventional SMA actuators relate to feedback, including determining position and strain sensing, which may allow for improved position control.

For example, position control of SMA actuators has been attempted using different control techniques and feedback signals. The most reliable feedback signal is typically direct position measurement. However, position sensors can be very expensive and add complexity to actuator assembly. As such, SMAs have not competed well with other actuation technologies such as piezoelectric and magnetic actuators. Sensor-less methods of sensing such as using electrical resistance (ER) as a feedback signal have been considered with regard to position control, however, in many of the studies, the applied stress is either constant or known in advance and has a monotonic relationship with displacement, such as occurs in springs.

Embodiments herein are intended to provide an improved actuator that includes a strain sensor and position sensing. An embodiment of an actuator 100 is shown in schematic form in FIG. 1. The actuator 100 is formed from a single wire 105 that has two sections having different alloy compositions. In this embodiment, a larger section facilitates actuation (the "actuation section" or "actuation portion" or "shape memory effect (SME) section" or "SME portion") 110 while a smaller section is used for sensing stress (the "stress sensing section" or "stress sensing portion" or "pseudo-elastic (PE) section" or "PE portion") 115. However, the size ratio of the actuation section and the stress sensing section may be varied depending on the application/parameters needed for the particular use of the actuator. Therefore, both actuation and stress sensing can be achieved in a monolithic SMA wire. The stress sensing section 115 is configured with transformation temperatures lower than the intended operating temperature of the actuation section 110, allowing the stress sensing section 115 to exhibit pseudo-elastic (PE) properties. The effects of temperature on PE behaviour are illustrated in FIG. 2. In this actuator, the applied stress is configured to remain below the pseudo-elastic plateau at any given temperature. This helps ensure operation is within the elastic deformation of the austenite phase, which then remains relatively constant and linear at different temperatures. The actuation section 110 is configured to have SME properties for actuation (movement) with higher transformation temperatures than the initial operating temperature and the temperature for the PE section 115.

Figure 2:
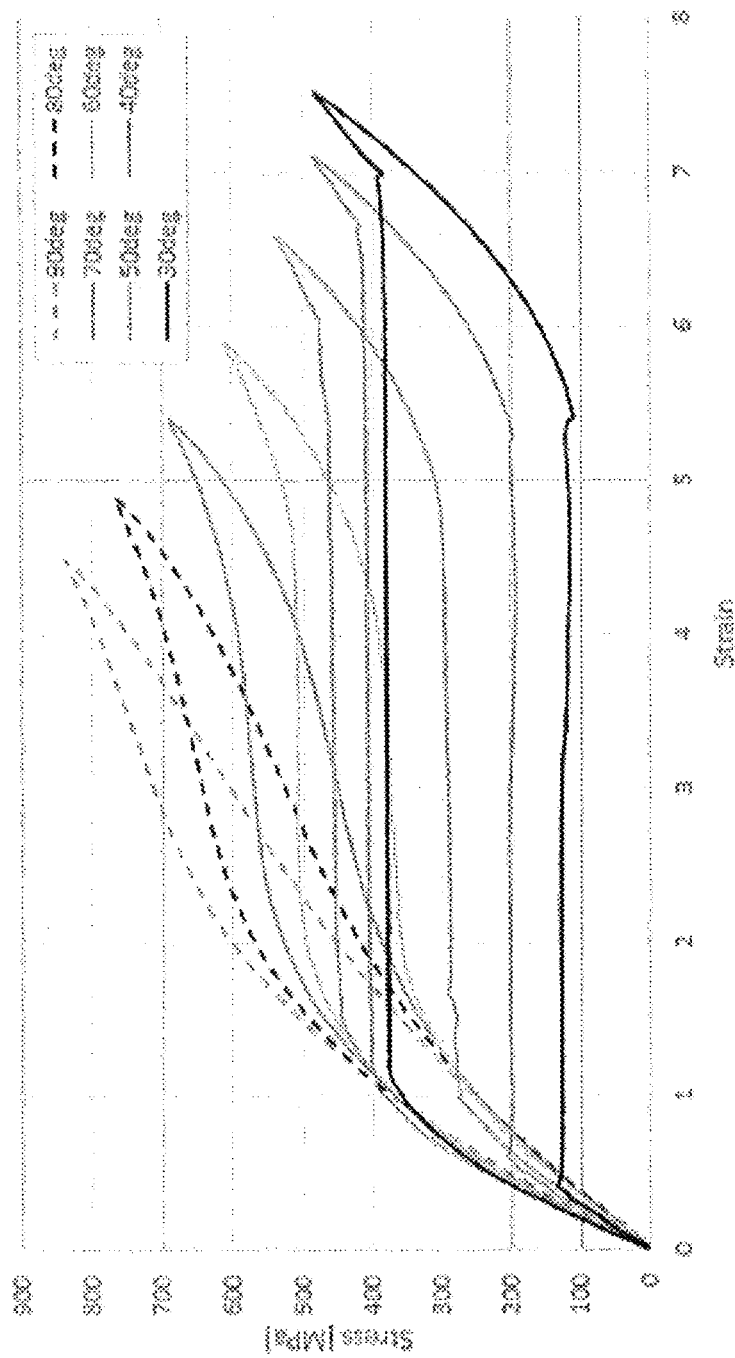
FIG. 2 shows experimental results showing effect of temperature on pseudo-elastic properties of a trained pseudo-elastic NiTi wire.

As shown in FIG. 1, the actuator can also include electrical contacts 120 for applying electrical current or for sensing. With this actuator, two electrical configurations can generally be available. One electrical configuration has the electrical current going through both PE and SME sections 115, 110 thus heating both sections; the second configuration has a majority of the current going through the SME section 110 only. Both of these configurations are functional, however, in the embodiments herein the latter configuration is described.

Manufacturing or fabrication of the actuator generally includes laser processing to tune composition (i.e. create the appropriate SME and PE sections 110, 115) followed by a thermo-mechanical treatment to achieve desired mechanical properties.

1.1. Laser Processing

Pulsed laser processing of an SMA has been shown to change the composition of the SMA in order to add additional "memories" to the SMA, that is, to provide for sections having differing transformation temperatures and thus affect properties related to PE (sensing) or SME (actuation). For additional detail on laser processing to SMAs, refer to PCT Patent Publication no. WO2011014962 (PCT App. no. PCT/CA2010/001219), the content of which is hereby incorporated herein by reference. Embodiments of this method/process can change the local functional properties of SMAs since the properties are sensitive to the alloy composition. Even subtle changes (for example, 0.01 at. %) can alter the functional properties of SMA's such as transformation temperatures and pseudo-elastic stresses. This technology opens the way for the fabrication of a monolithic wire having different sections with unique thermochemical and electromechanical properties such as described herein.

Figure 3A:
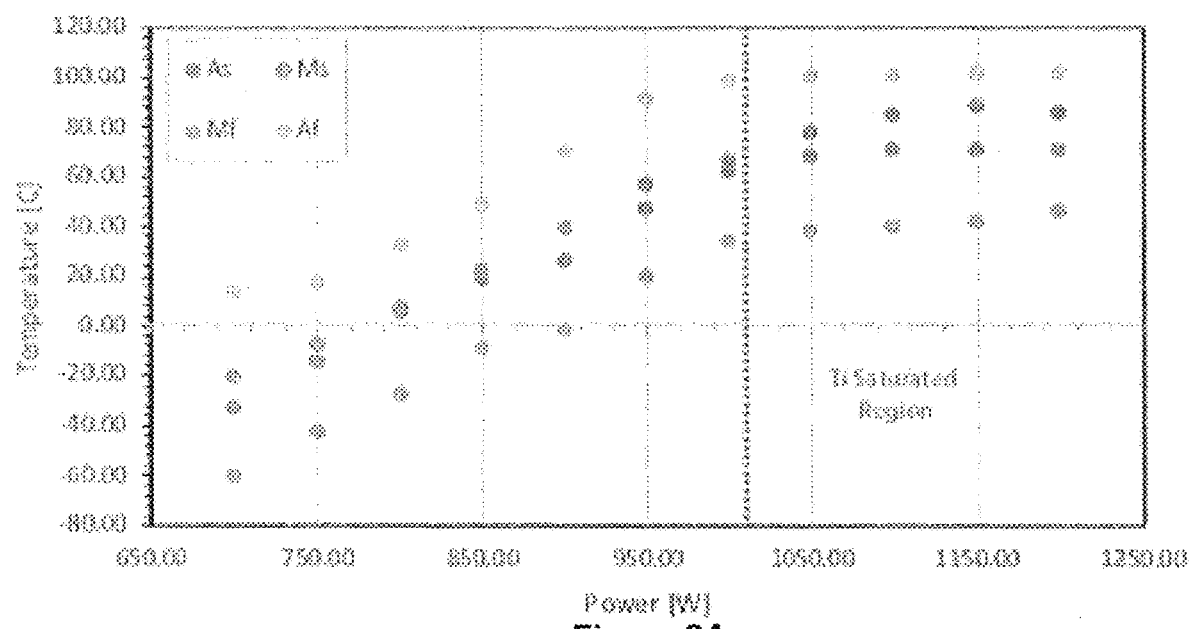
FIG. 3A shows the effects of laser power on phase transformation temperatures of laser processed NiTi, noting the Ti-rich saturation region.
Figure 3B:
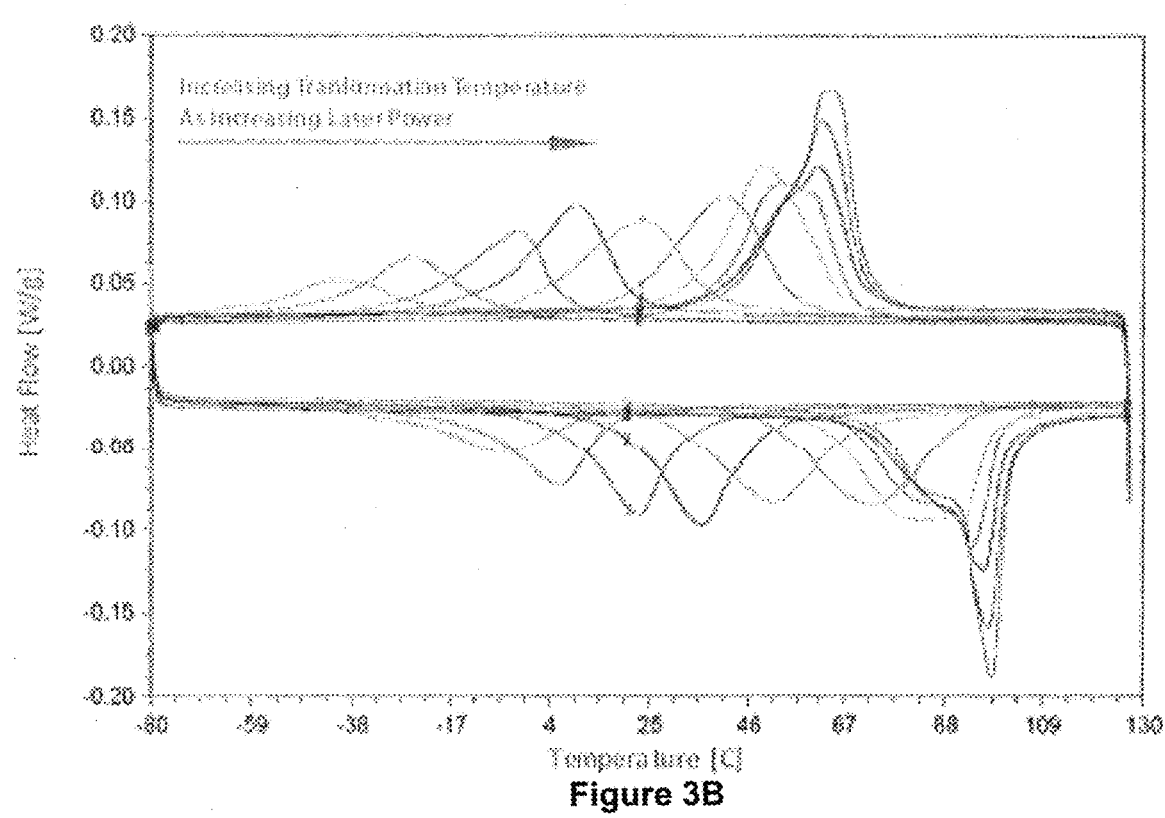
FIG. 3B shows DSC results showing the range and convertibility.
Figure 5A:
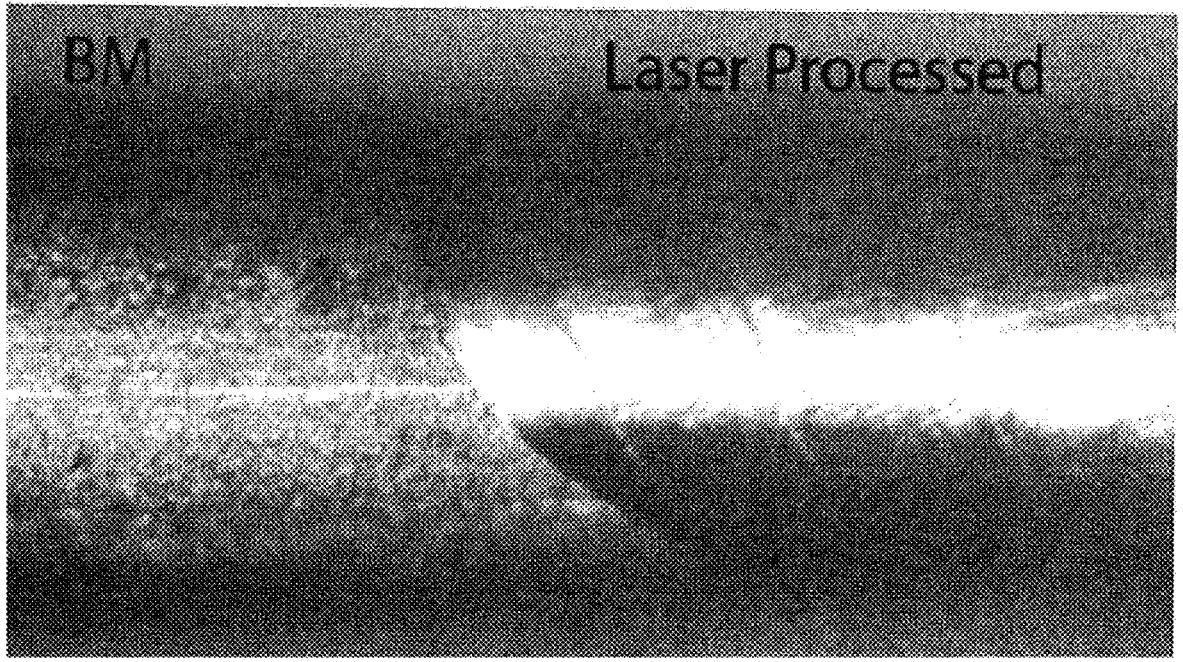
FIG. 5A shows a laser-processed NiTi wire showing the processed region base metal (BM)
Figure 5B:
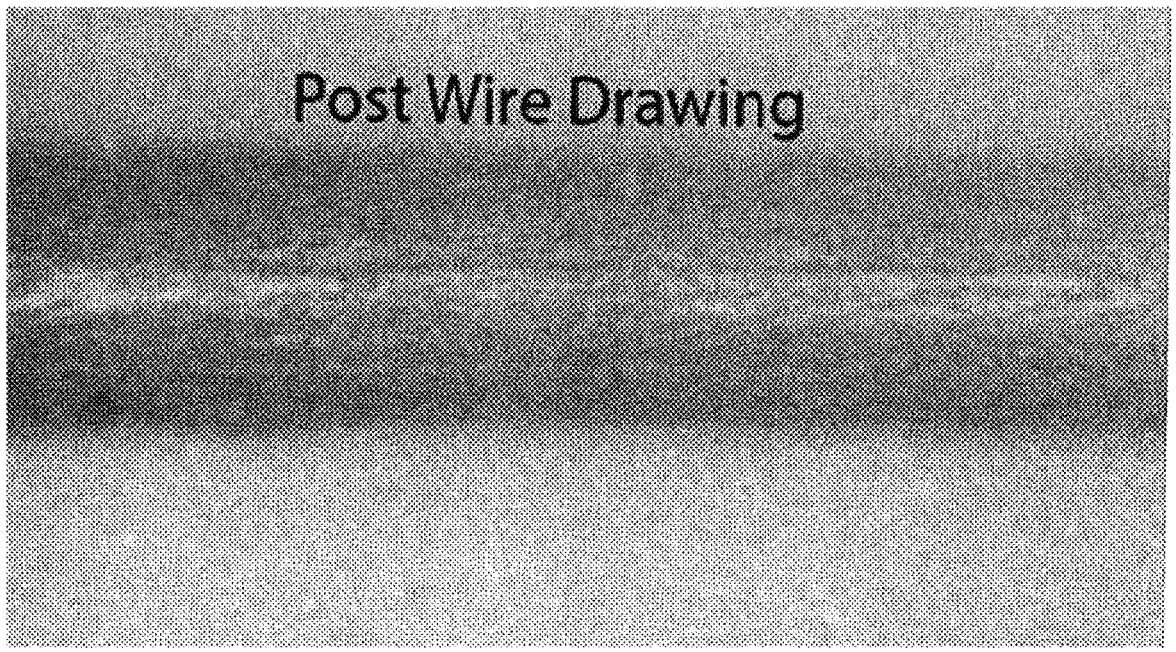
FIG. 5B shows a thermomechanical treated wire illustrating the uniformity of texture between BM and LP regions.

FIG. 3A illustrates the effect of a 5 ms laser pulse power on the transformation temperatures of NiTi and FIG. 3B is a differential scanning calorimetry (DSC) plot showing the range and convertibility of the laser processing. It can be shown that laser power has a direct impact on how much nickel is evaporated, which makes it possible to control the properties of different sections of the wire by controlling the amount of power. In addition to laser pulse power, laser pulse time and laser spot overlap have an effect on the properties as well as described in the noted PCT Patent Publication. For example, each pulse may be 60% overlapped on the previous pulse in order to provide a solidification line. FIG. 5A shows a magnified photo of a laser processed (LP) NiTi wire and illustrates the boundary between the original Base Metal (BM) and Laser Processed (LP) region. FIG. 5B shows the same wire after further processing.

Figure 4:
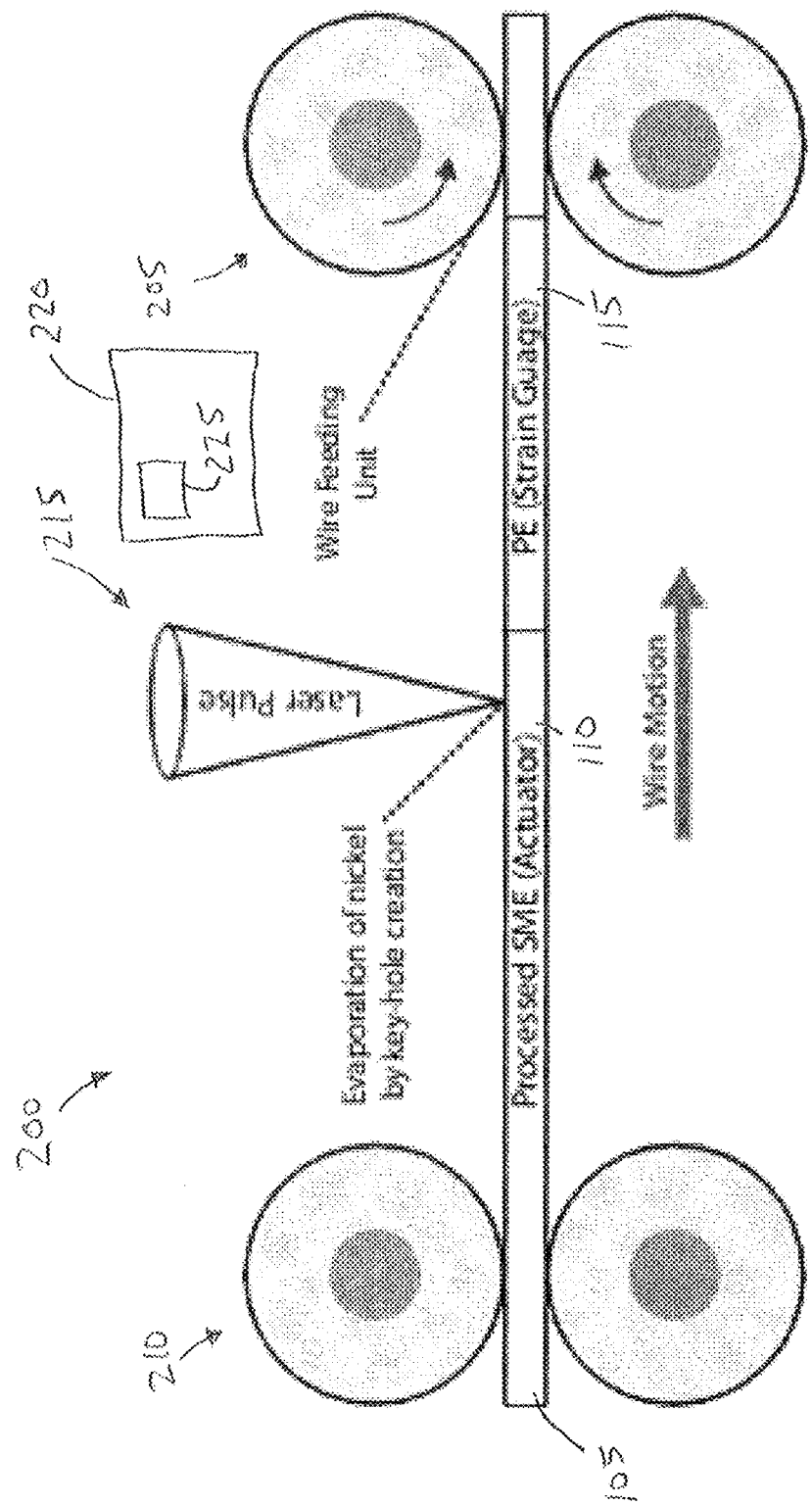
FIG. 4 is a schematic showing an embodiment of a continuous laser processing arrangement suitable for mass production of actuators.
Figure 6A:
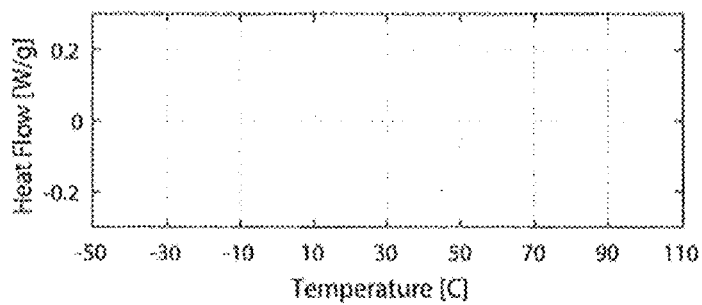
FIG. 6A shows various DSC results illustrating the phase transformation temperatures of base metal (and PE)
Figure 6B:
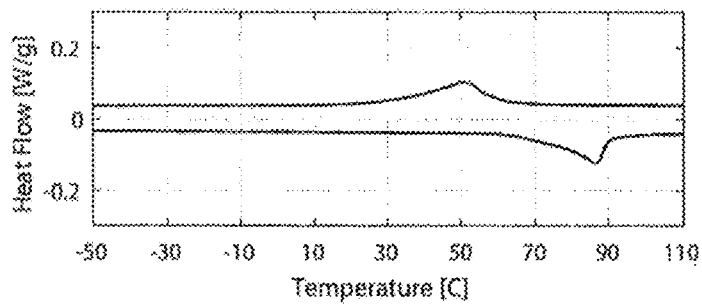
FIG. 6B shows various DSC results illustrating the phase transformation temperatures of laser processed.

Before laser processing, the BM wire may be cleaned using ethanol and acetone (or similar) to remove any impurities on the surface. Then, the BM wire is laser processed, for example, in a continuous fashion as shown in FIG. 4 using a computer controlled system 200. The system 200 may include wire feeding rollers 205, wire handling rollers 210, a pulsed laser 215, and a control system 220, including a processor 225. Generally speaking, due to the nature of SMA materials, only the sections that need to have SME properties need to be processed. In order to reduce or prevent oxidation, the wire can be processed inside an argon gas chamber or the like during processing. For the embodiment of the actuator herein, a 1000 W 5 ms pulse was used. Further details of a system and method for laser processing are described in US Patent Publication No. US20170165532, which is hereby incorporated by reference herein. FIGS. 6A & 6B show the DSC results of BM and LP wire. DSC results show the transformation temperatures and represent the change in material composition.

1.2. Thermo-Mechanical/Chemical Treatment

Figure 6C:
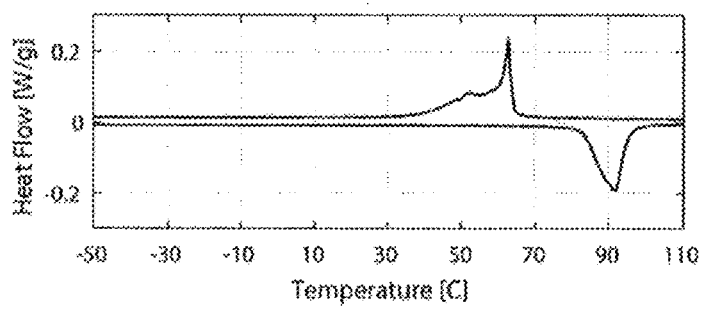
FIG. 6C shows various DSC results illustrating the phase transformation temperatures of post-thermomechanical treatment.

Thermomechanical treatment of the laser processed wires allow further configuration of the final microstructure and properties of the actuator. It is important to note that various heat treatments have an effect on the transformation temperatures and mechanical properties of SMA as well. Laser processing alters the wire microstructure; hence, after laser processing the wire may be solution annealed at, for example, 1000° C. for 1 hour. The wire may also be drawn though one or more dies in order to refine the grain structure and induce dislocations through work hardening. In this embodiment, the wire drawing process reduces the diameter of the wire from the initial 460 micrometers to 250 micrometers. In order to prevent excessive work-hardening and breakage, the wire may be inter-annealed at 600° C. for 15 minutes after every three dies. Upon completion of the wire drawing step, a final heat-treatment may be implemented, in this case at 480° C. for 2 hours. At this stage of the thermochemical treatment, the SMA actuator has a PE and SME portion as above. FIG. 6C shows the transformation temperatures after thermochemical treatment, and FIGS. 5A and 5B show the drawn actuator wire. As seen in these figures, after wire drawing, there is no longer a visible boundary between the BM and LP regions. The properties of the actuator are then stabilized, through a training process.

Figure 6D:
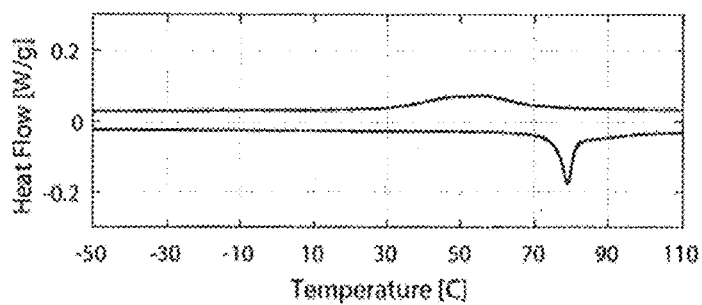
FIG. 6D shows various DSC results illustrating the phase transformation temperatures of post-training.

Typically, there are different types of training processes: isothermal stress cycling, isostress thermal cycling, or a combination of thermal and stress cycling. The training process is believed to induce directionally preferential grains in the microstructure of the material. For the embodiment of the actuator herein, approximately 1000 isostress thermal cycles were performed to train the SMA actuator. After training the diameter of the wire was reduced from 250 um to approximately 226 um. The difference in the transformation temperatures of the pre- and post-training can be seen in FIGS. 6C and 6D.

The majority of current publications in the SMA field make use of a commercially available NiTi SMA known as Flexinol. However, because of differences in alloy composition and thermochemical history of the SMA used herein, at least some of the mechanical and electrical properties of the proposed actuator may appear to be different from existing literature although the overall behaviour is similar. In the experiments conducted, the wire properties were generally determined experimentally.

2. Experimental Setup and System

Figure 7B:
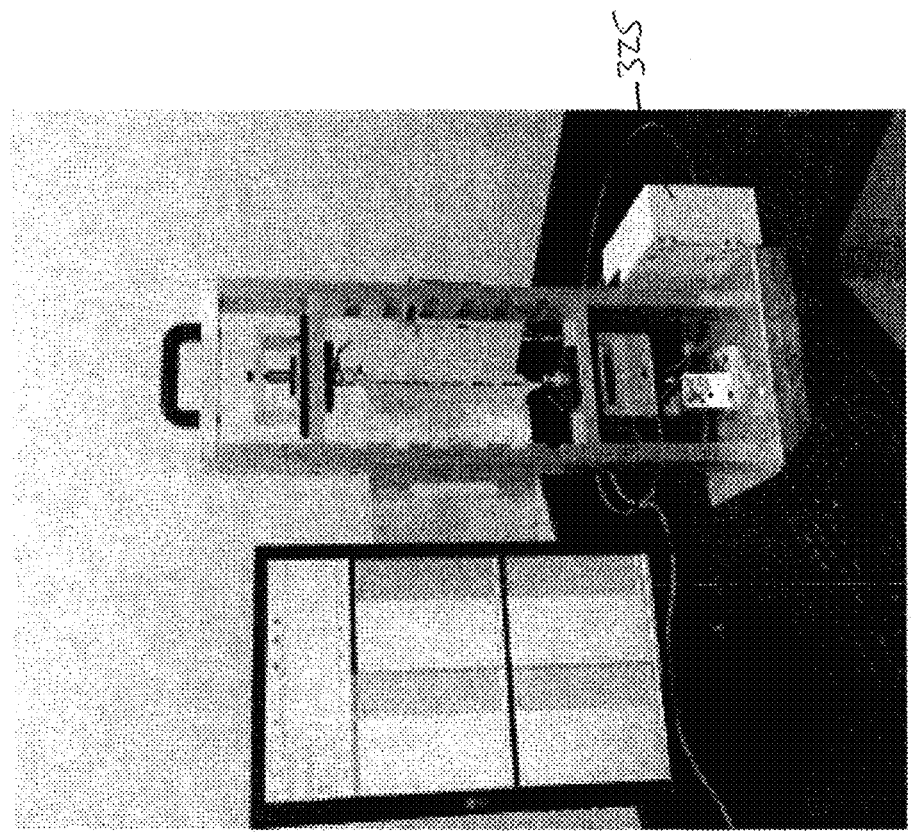
FIG. 7B is a photo of a standalone portable experimental setup.
Figure 7A:
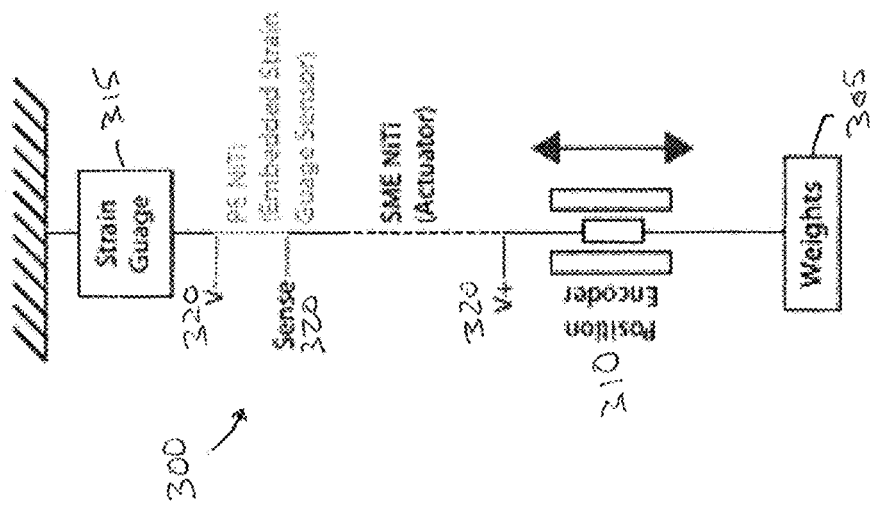
FIG. 7A shows an operational schematic of an experimental setup.

An experimental system was designed for characterization of the SMA actuator's electromechanical properties. FIGS. 7A and 7B show an operational schematic and a picture of an embodiment of the experimental system 300. The system 300 was equipped with a torque-controlled servomotor (not shown) to apply dynamic load to the actuator wire; however, in the experiment only static weights 305 were used. The actuator wire 105 was clamped between two stainless steel plates (not shown) at each end. The weights were connected to the bottom plates. The wire 105 was restricted to experience only vertical motion (torsional motion was restricted) using a linear spline bearing (not shown). Even though the linear bearing was well lubricated, the effects of friction in the bearing were present. As such, even with constant weights 305, the actual stress applied to the wire was not constant. In fact, the stress applied to the wire is a combination of acceleration forces, frictional forces, and gravitational forces (weights 305). The system 300 was enclosed in a plastic environment (not shown) to prevent chaotic and random air streams in the uncontrolled environment to have an effect on the convective coefficient of the wire 105. The experimental system was also equipped with sensors, including high precision position incremental optical position encoder 310, a strain gauge/load cell 315, and a precision ambient temperature sensor (not shown). Electrical connectors 320 were used to connect a voltage across the wire 105 and sense the current/voltage in the wire 105.

2.1 Current Driver & Measurement Circuitry

Figure 8:
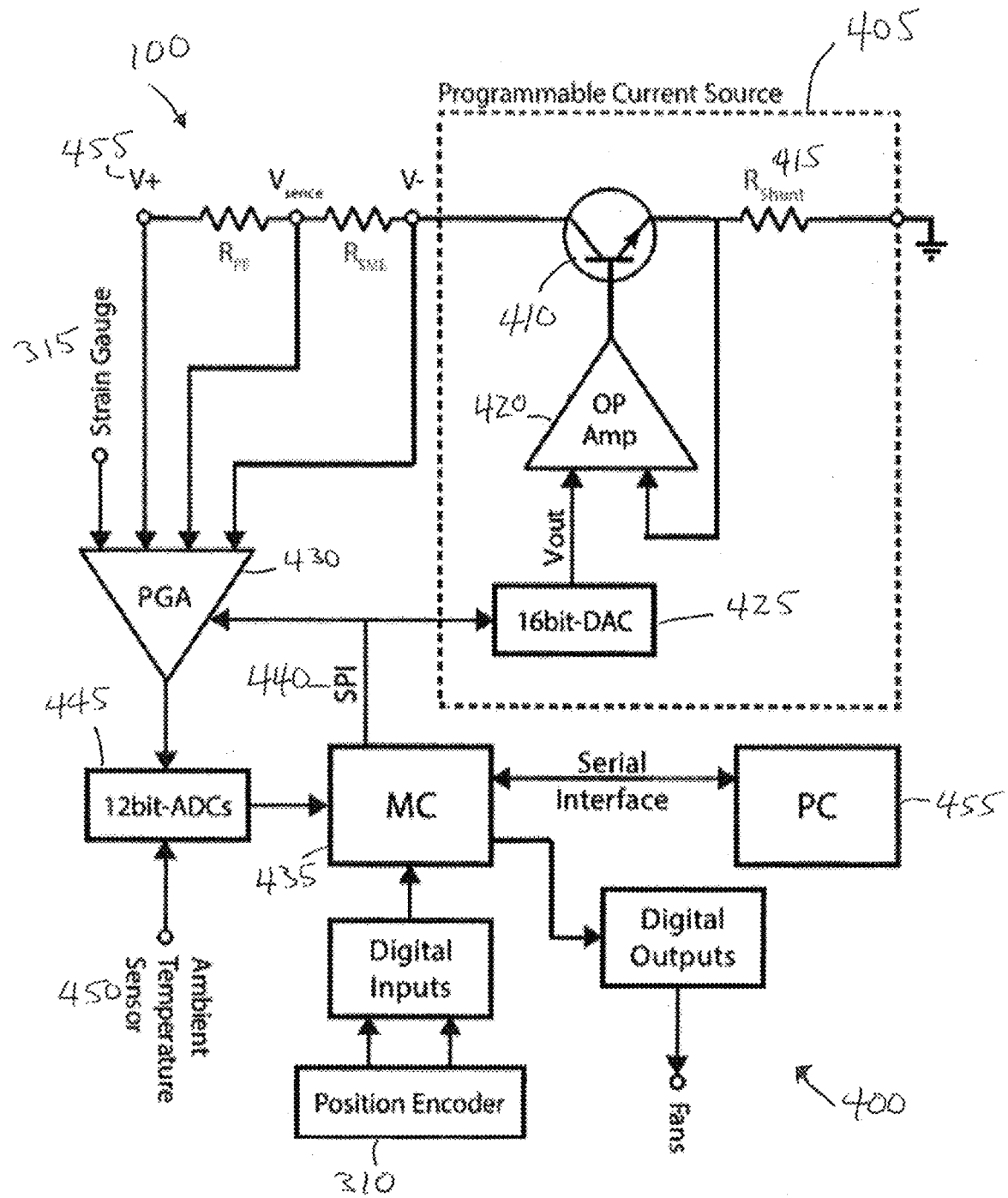
FIG. 8 is an electrical schematic of and embodiment of SMA actuator driver circuitry.
Figure 9A:
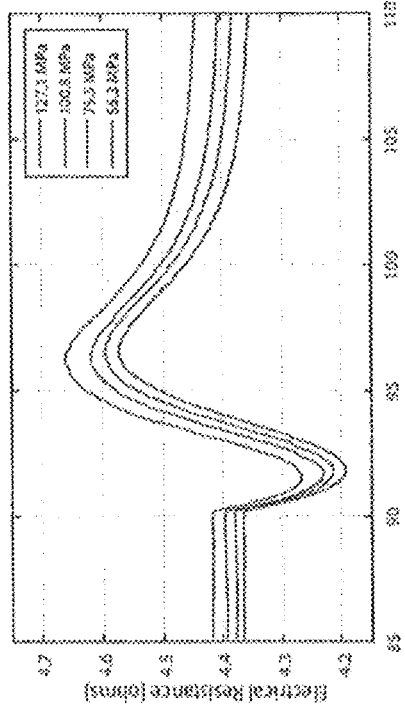
FIG. 9A shows data acquired from the electrical circuitry after applying noise cancellation filters: Electrical resistance during heating (martensite to austenite)
Figure 9B:
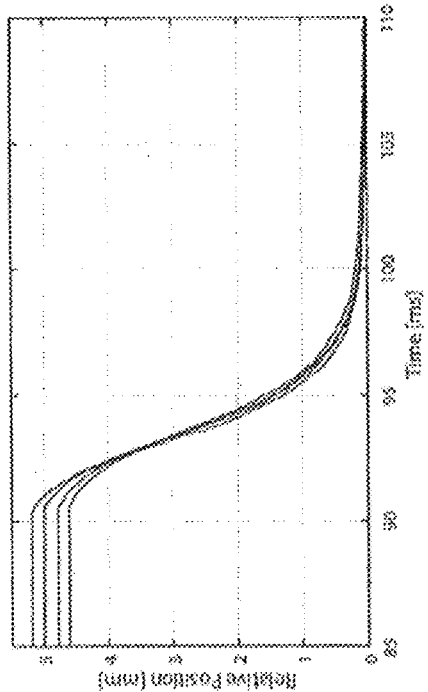
FIG. 9B shows data acquired from the electrical circuitry after applying noise cancellation filters: Electrical resistance during cooling (austenite to martensite)
Figure 9C:
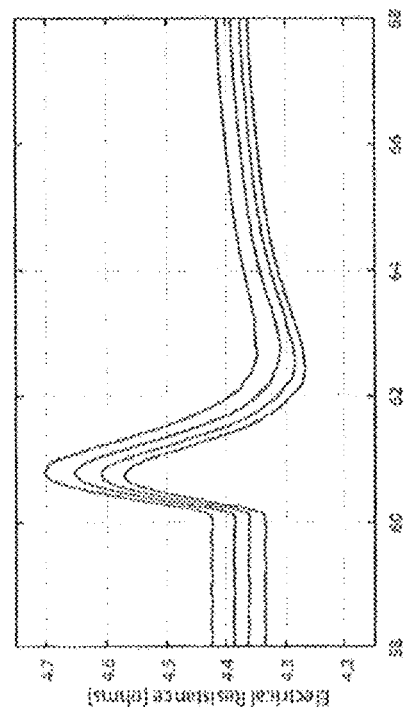
FIG. 9C shows data acquired from the electrical circuitry after applying noise cancellation filters: Position during heating.
Figure 9D:
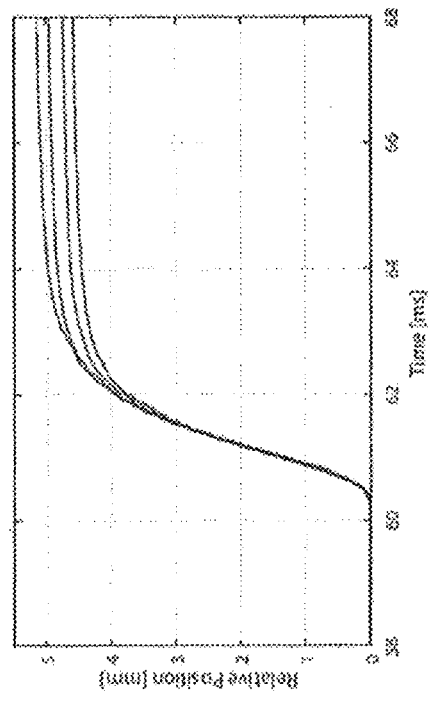
FIG. 9D shows data acquired from the electrical circuitry after applying noise cancellation filters: Position during cooling.

Heating of the wire was achieved through joules heating. In order to control the wire temperature, and subsequently the actuator position, a variable and controllable power supply 325 was used. Since a goal was to estimate the position of the actuator in a sensor-less fashion using two resistance measurements, the control circuit had to be able to measure two resistances very accurately. An embodiment of a control circuit 400 including a controllable current source 405 is shown in FIG. 8.

In this example, the current source 405 was implemented using a high gain darlington bipolar junction NPN transistor 410. The transistor 410 was located in a sinking configuration with respect to the electric load (actuator) 100. A low-side current sensing shunt resistor 415 was used to measure the current and feed it back to the negative input of a difference amplifier 420 connected to the transistor. A digital to analogue converter (DAC) (in this case 16-bit) 425 was connected to the positive input of the difference amplifier 420 and acted as the reference (commanded) current signal. This hardware feedback loop ran at 5 MHz and was configured to keep the commanded current constant under changing electrical load (actuator resistance).

In this example, resistance was calculated by measuring the current through the loads and measuring the respective voltage drop as shown in Equations 1 & 2. The measured current comes from the shunt resistor as described earlier. The two voltage drops across the PE and SME portions are measured using a high Common Mode Rejection Ratio (CMRR) of 140 dB differential Programmable Gain Amplifier (PGA) 430. CMRR is useful when measuring very small differential voltages as in the case of the PE portion of the actuator because, generally speaking, the higher the CMRR the better the signal to noise ratio. The gain of the PGA 430 is selected by the microcontroller (MC) 435 using Serial Peripheral Interface (SPI) protocol 440. High amplification gain was used for more sensitive measurements such as the voltage across the PE portion. Similar to the gain, PGA 430 contains a multiplexer and has 8 inputs which each pair can be selected for a differential via the SPI serial communication as well. In order to obtain higher effective resolution from the ADC, a technique called oversampling is used. Oversampling takes very fast consecutive analog to digital conversion and averages the converted values, therefore there is a trade-off between resolution and conversion speed. The output of the PGA 430 is passed on to a second analog to digital converter (ADC) 445, and the converted digital values are sent to MC 435. Additionally, in order to obtain not only precise but accurate voltage measurements, the ADC can use a precision voltage reference, and the conversions are calibrated for offset and gain errors using a secondary precision voltmeter.

$$R_{SME} = \frac{R_{shunt}(V_{sense} - V_-)}{V_{shunt}} \quad (1)$$

$$R_{PE} = \frac{R_{shunt}(V_+ - V_{sense})}{V_{shunt}} \quad (2)$$

The control circuit 400 also obtains other measurement data from the experimental system 300 such as actual stress using a strain gauge sensor 315, position of the actuator using a high resolution incremental optical encoder 310, ambient temperature sensor 450, and input voltage 455 to the system 300.

As evident from Equations 1 & 2, the lower the current, the higher the noise of the calculated resistance. In order to filter potential noise, the measured current and voltages were initially filtered by a median filter and a moving average filter. MC 435 was connected to a computer/processor 455, in this case, using an RS232 serial interface. All the measured data including time was sent to the computer 455 for logging. MC 435 was running at 200 Hz frequency, and the filtering and signal processing was performed in real-time on the microcontroller. Obtained position and electrical resistance of the SME section under different applied stresses can be seen in FIGS. 9A, 9B, 9C and 9D.

2.2. Electrical Connection

As previously mentioned, each end of the actuator wire was clamped between two stainless steel plates; and subsequently, the plates were connected to ring terminals that create an electrical connection between the current source circuitry and the actuator wire. For the purposes of this document, the middle sense probe was only connected by a temporary electrical connection. To calculate the true resistance of the actuator, and not the electrical connections and wiring, the resistances from the circuit to the connections was measured using a 4-wire resistance measurement technique to be 0.32 ohms.

3. Electromechanical Properties & Modeling

A thermal model of the actuator wire was developed in order to determine temperature-dependent material properties. After determining the material properties, they were used in a phenomenological model to describe the behaviour of PE and SME sections.

3.1. Simulating Temperature

Resistance properties of SME and PE can be dependent on the temperature of the wire. The temperature of the wire can be measured using thermocouples, thermal cameras or the like. However, due to the fine wire diameter (226 um) and a desire for improved accuracy, in these embodiments, the temperature of the actuator was simulated. The simulation was made using the PDE toolbox library in MATLAB based on the fundamental heat transfer parabolic PDE (Equation 3) given the measured resistance, elongation, input current, and ambient temperature. This method of using mathematical heat transfer models to infer the temperature of the SMA actuator wire has been used in other studies. However, most of these studies used a simple lumped capacitance approach to simplify the problem and involved a material having a constant composition. Using a more complex simulation, as presented below, can provide more accurate results, especially since the actuator wire has more than one material composition with different thermal properties in this embodiment.

$$\rho C \frac{\partial T}{\partial t} - \nabla \cdot (k \nabla T) = q \quad (3)$$

The actuator wire is considered to be a cylindrical body; therefore, axisymmetric with respect to its length. Equation 3 can be written in cylindrical coordinates as shown in Equation 4.

$$\rho C \frac{\partial T}{\partial t} - \frac{1}{r}\frac{\partial}{\partial r}\left(kr\frac{\partial T}{\partial r}\right) - \frac{1}{r^2}\frac{\partial}{\partial \theta}\left(k\frac{\partial T}{\partial \theta}\right) - \frac{\partial}{\partial z}\left(kr\frac{\partial T}{\partial z}\right) = q \quad (4)$$

Joules heating is modeled as internal heat generation $$\left(q = I^2 R(t)\left(\frac{1}{AL(t)}\right)\right).$$

Assuming radius is constant and thermal conductivity changes are very small $$\left(\frac{\partial T}{\partial \theta} = 0\right)$$

Equation 4 simplifies to:

$$r\rho C \frac{\partial T}{\partial t} - kr\left(\frac{\partial^2 T}{\partial r^2} + \frac{\partial^2 T}{\partial z^2}\right) - I^2 R(t)\left(\frac{1}{AL(t)}\right) \quad (5)$$

where r, z, ρ, C, k, T, R, L are radial direction, direction along the length, density, thermal capacity, thermal conductivity, temperature, current, resistance, and length respectively. Current, resistance, and length of the wire are provided to the simulation from experimental results. Thermal capacity was obtained from DSC tests as a function of temperature to represent the phase transformation under a stress-free state. Transformation temperatures of NiTi are a function of applied stress and increase as applied stress increases. The increase of the transformation temperatures were assumed to be linear in nature with respect to stress. This change in transformation temperatures should be accounted for as much as possible when modeling SMA actuators, especially when dynamic loading is anticipated, and can be modeled as follows:

$$M_{s,f}(\sigma) = C_M \sigma + M^*_{s,f}$$

$$A_{s,f}(\sigma) = C_A \sigma + A^*_{s,f} \quad (6)$$

Figure 10:
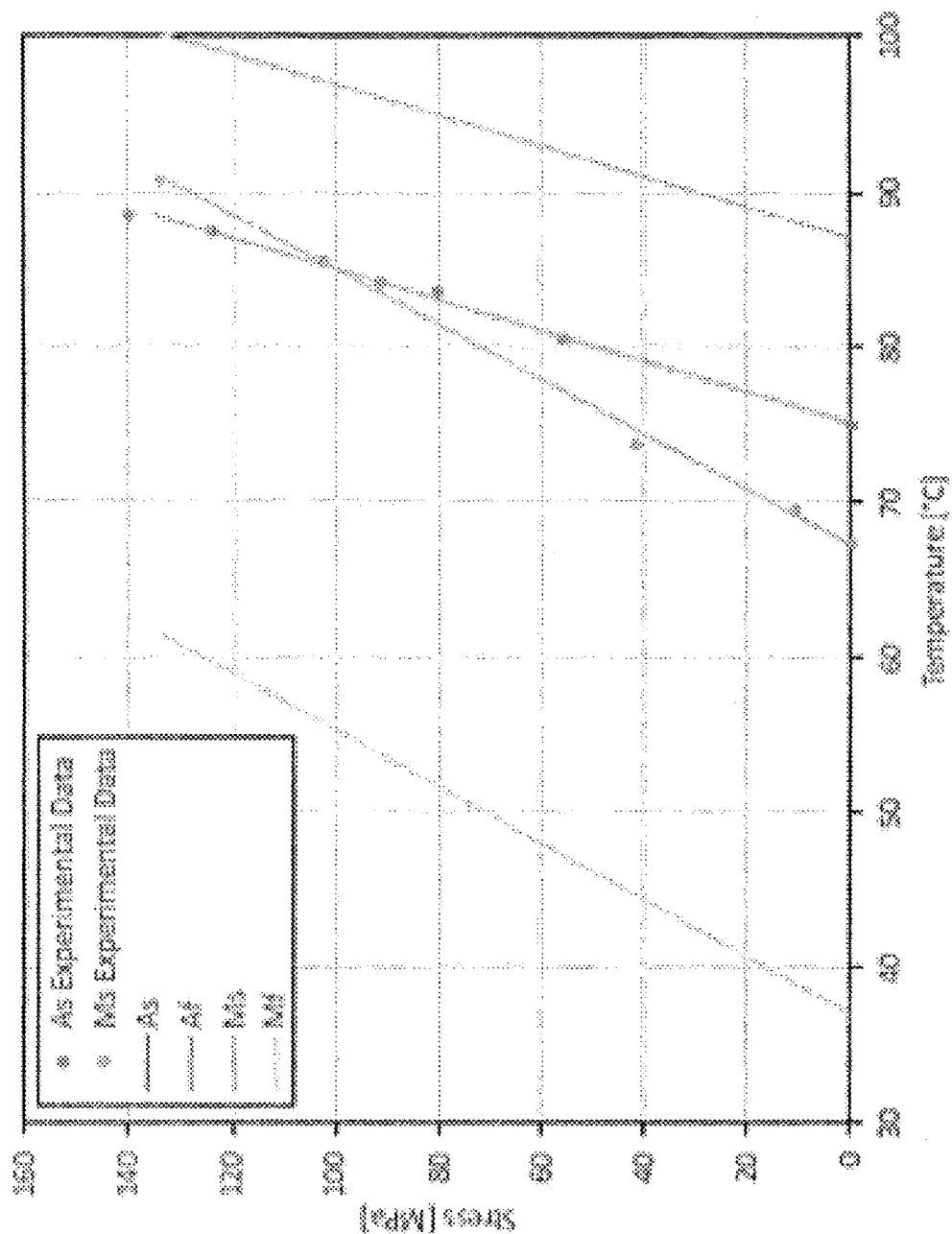
FIG. 10 shows transformation temperature of austenite and martensite phases of the SME portion of the laser processed SMA actuator verses applied stress wherein the slope of the martensite and austenite phase transformations are not the same.

The constants $C_A$ & $C_M$ were obtained empirically based on experiments conducted in steady-state conditions. $M_s$ and $A_s$ are found experimentally, $M_f$ and $A_f$ are assumed to be parallel respectively. The experimental data in FIG. 10 shows the relationships between transformation temperature and stress.

Thermal capacity for the PE and SME sections are different. Due to phase transformation, SME thermal capacity changes with respect to temperature accounts for the latent heat of transformation; however, PE does not undergo phase transformation and thus its thermal capacity coefficient is assumed constant. Thermal capacity in the simulation is defined by the following piece-wise relationship:

$$C = \begin{cases} C_{PE} & z \leq L_{PE} \\ C(T)_H & \dot{T} \leq 0 \\ C(T)_C & \dot{T} < 0 \end{cases} \quad (7)$$

Figure 11:
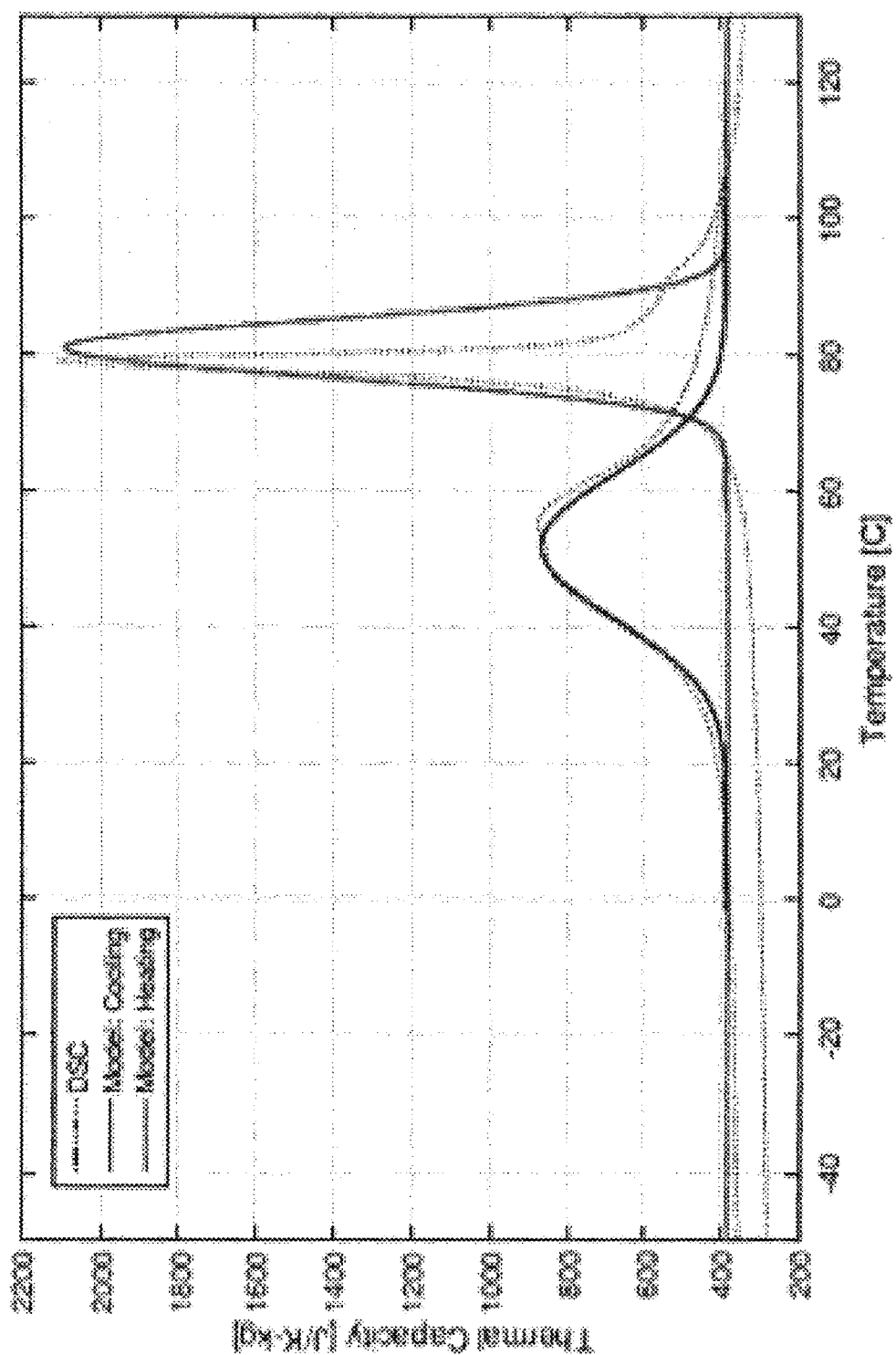
FIG. 11 shows thermal heat capacity obtained from DSC results of the SME portion of the actuator under stress-free conditions as well as the modelled stress-free thermal capacity based on normal distribution function, illustrating the presence of R-phase in the DSC results and not the modelled results.

The stress dependent thermal capacity for the SME portion is modeled based on a normal distribution-like function as shown in Equations 8 and 9. Where the middle of the curve is the average of phase transformation start and finish temperatures, and standard deviation is ⅙ of the difference of the transformation temperatures which represents 95% of transformation. The result of the thermal capacity model is shown in FIG. 11.

$$C(T)_H = A_p e^{-18\left(\frac{T - \frac{A_f + A_s}{2} - \frac{\sigma}{C_A}}{A_f - A_s}\right)} + C_p \quad (8)$$

$$C(T)_C = M_p e^{-18\left(\frac{T - \frac{M_f + M_s}{2} - \frac{\sigma}{C_M}}{M_f - M_s}\right)} + C_p \quad (9)$$

Since the PE and SME regions have two different material compositions, their thermal conductivities are different as well. As a result, thermal conductivity of martensite and austenite is also different, which makes the thermal conductivity of the SME region dependent on its phase transformation. Equation 10 describes the thermal conductivity as a weighted series summation of austenite and martensite thermal conductivities. Equation 11 is a piece-wise definition of thermal conductivity in the simulation.

$$k_{SME}(\xi) = (1 - \xi)k_A + \xi k_M \quad (10)$$

$$k = \begin{cases} k_{PE} & z \leq L_{PE} \\ k_{SME(\xi)} & \text{otherwise} \end{cases} \quad (11)$$

For the purposes of the simulation, the martensite phase transformation fraction is taken to be the ratio of elongation versus the maximum elongation under a particular stress.

Cooling of the actuator wire comes from heat convection and thermal radiation to the ambient environment. Thermal radiation is neglected and heat convection is implemented as a boundary condition to Equation 13. The heat convection coefficient of a cylindrical wire has been studied by others. Recently, the effects of angle of the wire with respect to horizontal on the convection coefficient has also been studied and is show in Equation 12:

$$h = \frac{k_\infty}{D}\left[A + C\left(\frac{16 g (T - T_\infty) D^3 P^2 Pr}{\mu^2 T_\infty R_c^2 Z^2 (T + T_\infty)^4}\right)^n\right] \quad (12)$$

Where g is gravity constant, $R_c$ is air gas constant, Z is air compressibility factor, D is the diameter of the wire, Pr is the Prandtl number, P is air pressure, μ is air dynamic viscosity, and k is air thermal conductivity. A, B, and n are empirical constants based on the angle of the wire. Since the temperature of the wire is not uniform along its radius and length, the average temperature is considered for the PE and SME sections. The simulation was run multiple times for different applied stresses to the actuator.

3.2. SME Modeling & Properties

There are various approaches to modelling SME behaviour, such as micro-mechanical and thermodynamics modelling based on the crystal structure and the fundamental laws of physics. However, these models can be complicated and difficult to define; therefore, a macroscopic phenomenological approach was chosen for the purposes of the embodiments herein. This type of modelling is very common for the purposes of actuation and controls; and can be done in two major categories: machine learning and numerical methods or mathematical function based. Any of these modelling approaches can be applied for the proposed actuator design.

Equations 13 & 14 are a set of functions which phenomenologically model the transformation behaviour by calculating the martensite phase fraction based on empirical results. Other sigmoid-like functions with slightly different curvatures such as cosine and sine, error function, and inverse tangent have also been used to model SMA phase transformation.

$$M \rightarrow A: \xi(T, \sigma) = \left[\frac{\xi_a}{1 + e^{km\left(T - \frac{A_s + A_f}{2} - \frac{\sigma}{Cm}\right)}}\right] + \xi_b \quad (13)$$

$$A \rightarrow M: \xi(T, \sigma) = \left[\frac{\xi_a}{1 + e^{kd\left(T - \frac{M_s + M_f}{2} - \frac{\sigma}{Ca}\right)}}\right] + \xi_b \quad (14)$$

The condition of phase transformation is given by Equations 15 & 16.

$$M \rightarrow A: A_f + \frac{\sigma}{c_A} > T > A_s + \frac{\sigma}{c_A} \;\&\; \dot{T} - \frac{\dot{\sigma}}{c_A} > 0 \quad (15)$$

-continued $$A \to M: M_f + \frac{\sigma}{C_M} < T < M_s + \frac{\sigma}{C_M} \ \& \ \dot{T} - \frac{\sigma}{C_M} < 0 \quad (16)$$

Due to the varied material properties, and the presence of R-phase (as evident in FIG. 11) and other metallurgical phenomena such as a slight two-way shape memory effect of the fabricated actuator, a linear correction to Equation 13 was added to provide better agreement with the experimental results. This may not be necessary in all embodiments of the actuator.

Resistance of the SME is modeled by adding the martensite and austenite portions of resistance as a set of series resistors with respect to martensite phase fraction as shown in Equation 17. Additionally, since transformation propagation starts from the outer ends of the wire and works its way inwards, the series model makes phenomenological sense as well.

$$R_{S\,ME}=(1-\xi)R_A+\xi R_M \quad (17)$$

The individual resistances of austenite and martensite are modeled as a linear function of stress and temperature, and the correlation is obtained empirically in a set of steady-state experiments. Equation 18 shows this linear relationship. Constants $R^o_{A,M}$, $R^T_{A,M}$ and $R^\sigma_{A,M}$ are curve fitting parameters and are obtained based on empirical data such as that shown in FIGS. 9A, 9B, 9C and 9D.

$$R_{A,M}(\sigma,T)=R_{A,M}{}^o+R_{A,M}{}^T T+R_{A,M}{}^\sigma \sigma \quad (18)$$

Similar to resistance, the elastic module of the SME is also a function of phase fraction. However, with similar logic as the resistance model, the elastic model is added as two elastic members in parallel.

$$E_{SME}(\xi) = \frac{1}{\frac{1}{(1-\xi)E_A} + \frac{1}{\xi E_B}} \quad (19)$$

The classical constitutive model of the SME is given as follows:

$$\dot{\sigma}=E_{S\,ME}(\xi)\dot{\varepsilon}_{SME}+\theta_{S\,ME}(\xi)\dot{T}_{S\,ME}+\Omega(\xi)\dot{\xi} \quad (20)$$

$\theta_{S\,ME}$ represents the thermal expansion of the and it's also a function of the phase transformation.

$$\theta_{S\,ME}=(1+\xi)\theta_A+\xi\theta_M \quad (21)$$

The stress component of the phase transformation $\Omega$ is expressed in Equation 22; where, $\varepsilon E_{S\,ME}{}^{max}$ is the maximum recoverable strain.

$$\Omega=\varepsilon_{S\,ME}{}^{max}E_{S\,ME}(\xi) \quad (22)$$

Figure 12:
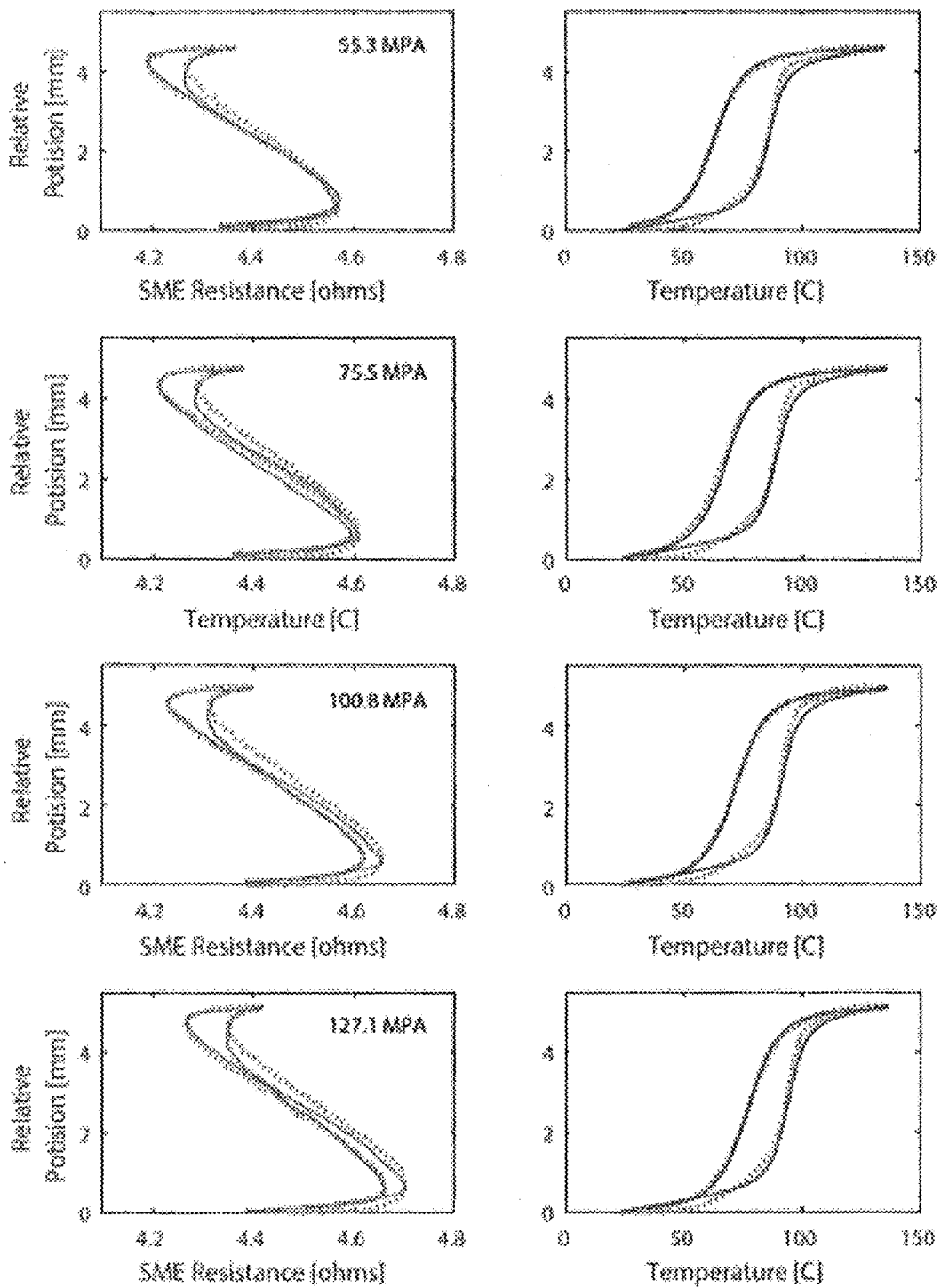
FIG. 12 illustrates graphs of experimental (dotted) and SME model (solid) results showing position versus resistance and position versus temperature under different applied stresses.

The results of the SME modelling under different applied stresses is shown in FIG. 12 and compared with experimental data. Note that the temperature is simulated and not measured. The model is closer to experimental results for the austenite to martensite transformation for material-related reasons mentioned herein.

3.3. PE Properties & Modeling

Unlike the SME portion of the actuator, the PE portion does not undergo phase transformation since the applied stress is assumed to be below the pseudo-elastic plateau stress, thus the actuation happens only in the elastic region. Therefore, the maximum stress applied to this actuator design should be below the pseudo-elastic plateau at any given temperature. For this reason, its behaviour is very similar to regular elastic alloys. Thus, the resistance of PE portion's elastic region is linearly dependent on stress and temperature as shown by experimental data in FIG. 13.

$$R_{PE}(\sigma,T)=R_{PE}{}^o+R_{PE}{}^T T+R_{PE}{}^\sigma \sigma \quad (23)$$

Figure 13:
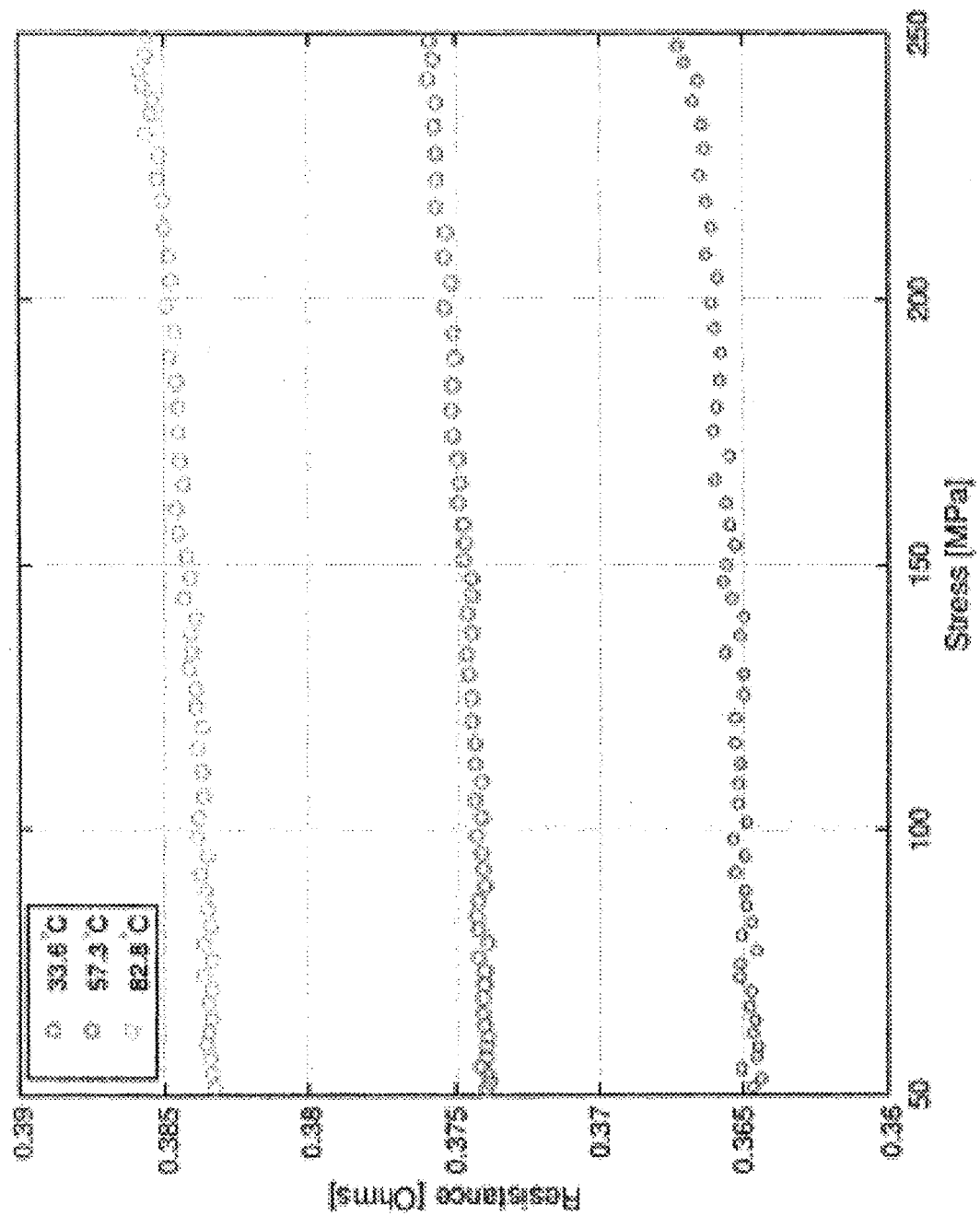
FIG. 13 shows the resistance of PE versus different stresses and temperature.

This linear relationship of PE elasticity can be modeled the same as the SME martensite and austenite resistances expressed in Equation 18. Therefore, due to the lack of phase transformation (hysteretic behaviour), an explicit relationship between the temperature of the PE portion and applied stress to the actuator can be obtained. The experimental resistance measurements of the PE region with respect to different stresses and temperatures are shown in FIG. 13.

$$\dot{\sigma}=E_{PE}\dot{\varepsilon}_{PE}+\theta\dot{T}_{PE} \quad (24)$$

3.4. Controllable Actuation Range

The actuation range of the SMA actuator is generally dependent on the stress applied to the wire. Generally speaking, only the elongation of the wire that is due to phase transformation and thermal expansion can be controlled by joules heating and not the elongation caused by elasticity of material. For example, if the SME portion is completely in austenite phase and stress increases, the position of the actuator becomes purely a function of the applied stresses (and negligible thermal expansion) which cannot be controlled by changing the temperature of the wire. Therefore, these limitations of range and stress level have to be taken into account for different applications. The overall length of the proposed actuator (actuator position) is expressed in the following equation.

$$L=\varepsilon_{PE}L_{PE}+\varepsilon_{S\,ME}L_{S\,ME} \quad (25)$$

4. Position Estimation Algorithm

Embodiments of a position estimation algorithm (PEA) have been developed based on the empirical models described in the previous sections. The purpose of this section is to outline an algorithm which estimates the position of the SMA actuator wire by measuring the two resistances ($R_{PE}$ & $R_{SME}$) as proposed earlier. This embodiment of the PEA works on the assumptions that the PE and SME are both under the same stress and thermal environmental conditions such as ambient temperature and convection.

Since the PE section only operates in its elastic region, there is no phase fraction equation, and the stress-temperature relationship can be directly obtained from Equation 23. However, as shown in FIG. 13, the effect of temperature is larger than the effect of stress. Therefore, in order to obtain the applied stress, both the temperature and resistance of the PE need to be known. Equation 26 is a simplified lumped capacitance heat-transfer transfer function which calculates the temperature of the PE section in real-time and is part of the PEA. It is based on the previous temperature of the SME region, ambient temperature, thermal capacity of PE, resistance of the PE, thermal conductivity, and the electrical current going through the PE region. The distance between the center of the PE portion and SME portion is denoted as L*. $A_{PE}$ is the surface area of the PE potion. Since the properties of the PE region are more constant due to the lack of phase transformation, it is easier to calculate the temperature of PE rather than SME on-line.

$$T_{PE(S)} = \frac{I^2 R_{PE} + hA_{PE}T_\infty + \frac{kA_s}{L^*}T_{SME}^{t-1}}{m_{PE}C_{PE^S} + \frac{kA_S}{L^*} + hA_{PE}}$$

At each time instance, depending on the direction of phase transformation, the Equations 13 or 14 are calculated based on the memory-dependent constants $\xi a$ & $\xi b$. Then, the calculated martensite phase fraction equation is plugged into the resistance model in Equation 17. By measuring the resistance and using Equation 17, a relationship between the SME temperature and stress can be obtained for that specific time instance. Thus, by using the stress obtained from the PE region, the temperature of the SME region at the current time can be calculated.

Figure 14:
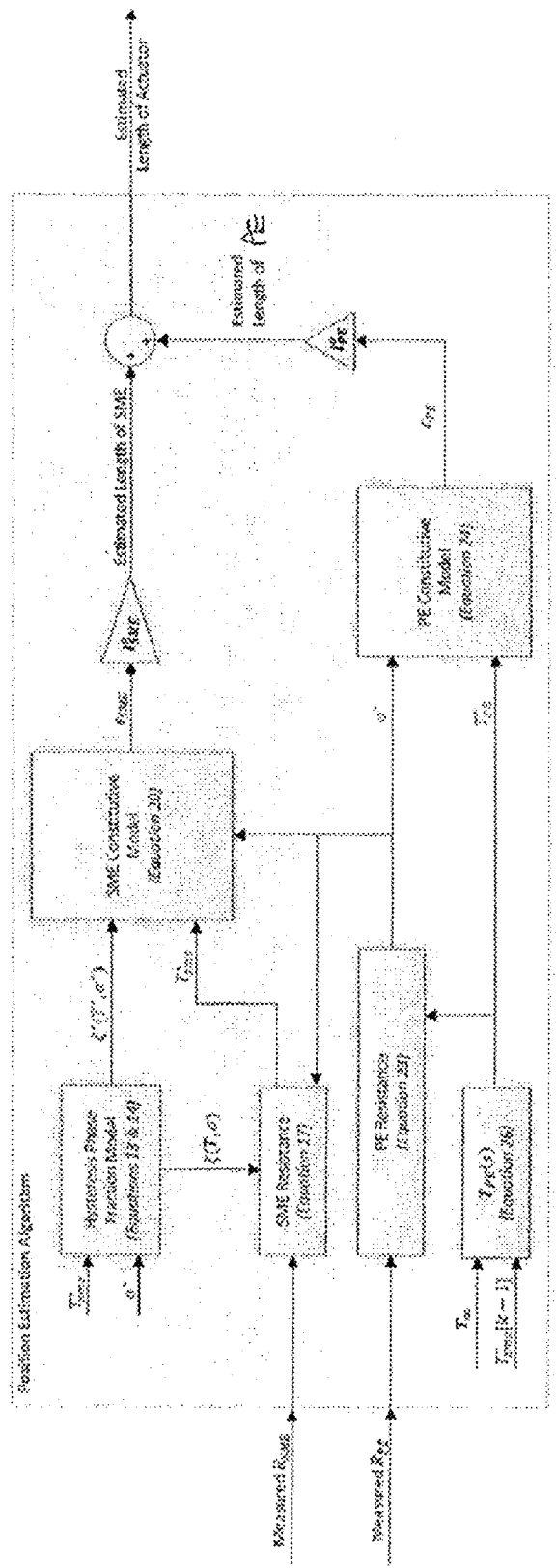
FIG. 14 is a block-diagram showing the conceptual structure of the position, temperature, and stress estimation algorithm.

The results could be thought of as estimated temperatures and stress of the actuator wire. These estimated parameters can now be plugged back into both SME and PE models explained in previous sections to obtain a fully resolved state of the actuator. Therefore, using the models and the estimated stress and temperatures the positions (length) of the actuator wire can be estimated under varying applied stresses. Additionally, the estimated stress can be used directly in force control systems or the like. An embodiment of a PEA is summarized in a block diagram illustrated in FIG. 14. As shown in FIG. 14, the various equations described are used to determine the length/position of the actuator.

Figure 15:
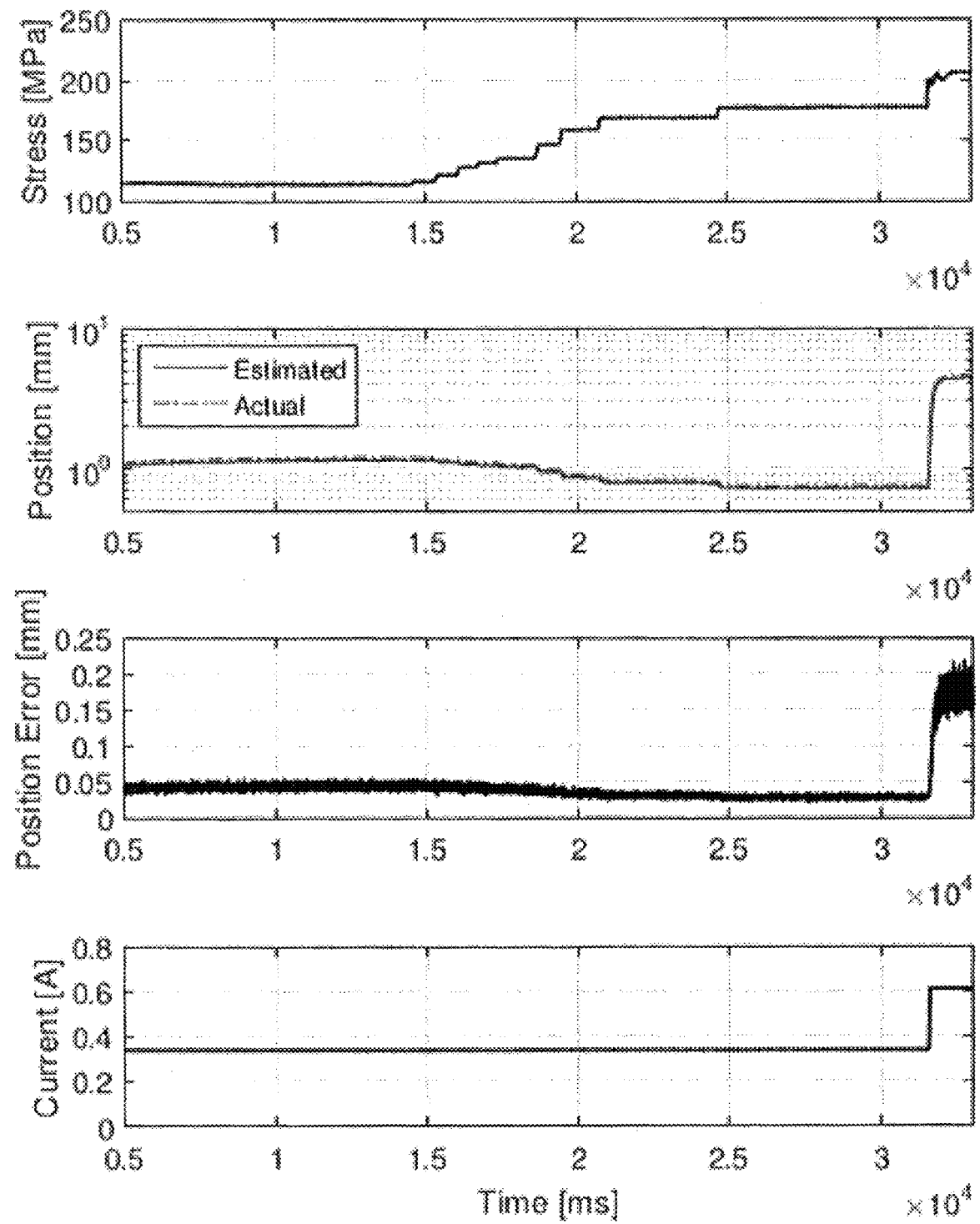
FIG. 15 illustrates graphs of position estimation results showing the estimated position (and position error) under varying stress levels.

FIG. 15 shows the applied current, estimated and measured position, position error, and measured stress. Initially an open-loop steady state current of 0.34 A is supplied to the actuator. Subsequently, the actuator contracts and reaches a steady-state position. At this stage, extra weights are added to increase the applied stress on the actuator wire. As the weights are added, the wire starts to extend. And finally a current of 0.6 A is supplied to the wire to fully transform it to austenite. As can be seen from the presented results, the PEA tends to follow the actual position very closely. In this experiment, a maximum position error of 160 um was achieved, which is approximately 4% of the total presented actuation under the maximum stress presented.

The approach in this embodiment generally relies on having an accurate empirically based mathematical model for both the PE and SME sections of the wire. Therefore, any differences between the model and reality can result in an error in the estimated parameters, such as position. However, parameter identification, artificial intelligence, and adaptive techniques could be used to enhance the material and environmental properties used in the model. Further tuning of the various models and algorithm should allow for better results.

In this document, a novel SMA actuator design with an embedded strain gauge sensor containing two different material compositions in one monolithic piece of actuator wire is proposed and a method of operation and fabrication/manufacturing was discussed. An electronic circuit board was designed to provide a linear current source power supply for the actuator as well as to measure resistances, such as high-side resistances. Additionally, a model-based position estimation algorithm was developed based on the proposed actuator design.

VARIOUS EXAMPLES FOR ACTUATORS

Example 1

SMA Actuator with Embedded Sensor

Actuator Design: (as Shown in FIG. 1)
The SMA actuator wire includes two different material composition sections along its length in one monolithic piece of wire. One of the material composition sections acts as an actuator, and the other acts as an embedded sensor. Therefore, this design incorporates both sensing and actuation in one device. The actuation can be caused due to pseudo-elastic actuation or shape-memory effect.

Position Estimation:
The position and force of the actuator is estimated using two resistance measurements of the two different sections of the actuator wire as described above. These resistance measurements are passed on to a model based and/or a machine learning estimation algorithm.

Example 2

Monolithic Spring-Biased SMA Actuator and Inductance Position Control

Figure 16:
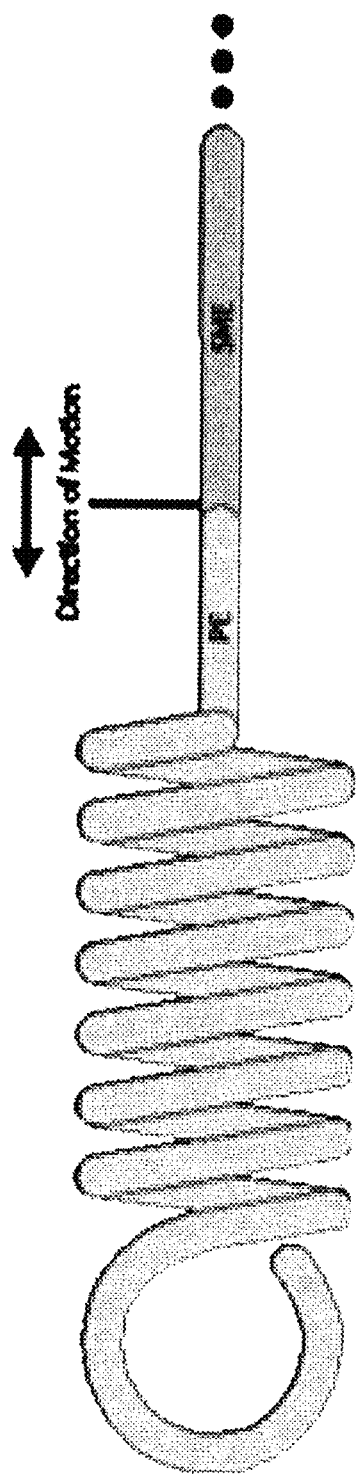
FIG. 16 shows another embodiment of an actuator.

Actuator Design: (as Shown in FIG. 16)
The SMA actuator wire includes two different material composition sections along its length in one monolithic piece of wire. One of the material composition sections acts as an actuator, and the other is formed into a spring shape and acts as both a sensor and a biasing force.

Position Estimation:
The position and force of the wire is calculated using the inductance measurements of the spring portion of the wire. Inductance of the spring changes as its pitch distance changes. The larger the extension, the lower the inductance. Inductance measurement can be done using, for example, three different methods: Rise-time, frequency counting using LC resonator circuit, and frequency response amplitude measurement with a high-pass peak-detection circuit. Subsequently, the inductance is mapped to position, and the calculated position is then used in a control algorithm to control the position. In addition to inductance, the resistance of the actuator may also be measured (as described above) and can assist to determine the state of the phase transformation.

Example 3

Continuously Variable Nickel Content to Linearize SMA Behaviour

Based on the principle of Fourier Series, any monotonic continuous function can be obtained (or approximated) using an infinite (or finite) summation of a series of trigonometric functions. The same principle can be applied to laser processed SMA wires to manipulate the effective properties of the actuator for different applications. It is known that the laser pulse power and time applied has an effect on the nickel composition of the wire (i.e. amount of nickel evaporated). Therefore, by controlling the laser pulse, the amount of nickel can be controlled, thus controlling the thermomechanical and electromechanical properties of the processed sections. By summing up a number of small sections with different properties, the net effective properties can be shaped and optimized for a specific application. For example, different sections of the wire can have varying amounts of nickel content which would linearize mechanical or electrical properties for passive and active applications, thus making the controllability of the actuator much easier.

Example 4

Magnetical Vibration Induced Cooling of Bundle of SMA Actuators

Based on the principles of electromagnetism, current carrying wires which have the same direction of current attract each other and if they have the opposite direction of current they repel each other. The same principle can be used in bundles of SMA actuator wire as well. By switching the direction and amplitude of the current at a frequency, the wires in the bundle will attract and repel each other therefore causing a vibration at that frequency as well. This vibration creates an effective forced convection on the wire which causes the wire to cool down at a much faster rate than free convection. The frequency of the vibration can be chosen to be outside of human hearing range.

The various embodiments above can also be combined to create other actuator designs. Some of the applications of the above embodiments include, but are not limited to: Exoskeleton, Haptic Feedback, Adaptive seating (backrest and lumbar support), Virtual Reality and Rehabilitation Gloves, Wearables, Robotics, Automotive (actuators, valves, and the like), Biomedical Devices and Prosthetics (stents, actuators, end effectors, and the like), Aerospace Engineering (Morphing Wings, UAVs), and various others.

Although the present disclosure has been illustrated and described herein with reference to various embodiments and specific examples thereof, it will be readily apparent to those of ordinary skill in the art that the elements of the embodiments may be combined in other ways to create further embodiments and also other embodiments and examples may perform similar functions and/or achieve like results. All such equivalent embodiments and examples are within the spirit and scope of the present disclosure as defined by the claims. For example, the principles and concepts herein are believed to apply to other shape memory materials, including shape memory plastics or the like.

In the preceding description, for purposes of explanation, numerous details may be set forth in order to provide a thorough understanding of the embodiments. However, it will be apparent to one skilled in the art that these specific details may not all be required. In other instances, well-known structures may be shown in block diagram form in order not to obscure the understanding. For example, specific details are not provided as to whether elements of the embodiments described herein are implemented as a software routine or computer readable code to be executed by a processor or as a hardware circuit, firmware, or a combination thereof.

The invention claimed is:

1. A shape memory actuator comprising:
a monolithic shape memory alloy;
a shape memory effect (SME) section of the monolithic shape memory alloy, configured for actuation;
a pseudo-elastic (PE) section of the monolithic shape memory alloy, configured as a sensor for enabling position sensing of the shape memory actuator;
the PE section is configured to have transformation temperature lower than intended operating temperature of the SME section; and
a control system configured to control the actuator by controlling a current through at least the SME section based on the sensor results of the PE section.

2. A shape memory actuator according to claim 1, wherein the PE section is configured as a strain gauge.

3. A method of controlling a shape memory actuator, the method comprising:
applying a predetermined current through the actuator via a control system;
measuring a first resistance of a shape memory effect (SME) section of the actuator;
measuring a second resistance of a pseudo-elastic (PE) section of the actuator;
calculating an estimated position of the actuator, via the control system, based on the first and second resistances; and
adapting the current applied to the actuator, via the control system, based on the estimated position.

4. A method of manufacturing a shape memory actuator, the method comprising:
laser processing the monolithic shape memory alloy to provide the shape memory effect (SME) section having a different transformation temperature than the pseudo-elastic (PE) section;
thermomechanically treating the laser processed shape memory alloy; and training the thermomechanically treated shape memory alloy;
wherein the shape memory actuator is according to claim 1.

5. A method according to claim 4, wherein the thermomechanically treating comprises:
solution annealing the laser processed shape memory alloy;
work hardening the laser processed shape memory alloy; and
heat treating the laser processed shape memory alloy.

6. A method according to claim 5, wherein the work hardening comprises:
drawing the laser processed shape memory alloy through one or more dies; and
periodically inter-annealling the laser processed shape memory alloy during drawing.

7. A method according to claim 4, wherein the training comprises one or both of isothermal stress cycling or isostress thermal cycling.

* * * * *